United States Patent
Akita (10) Patent No.: US 7,530,229 B2
(45) Date of Patent: May 12, 2009

(54) CONTROL DEVICE FOR SUPERCHARGER WITH ELECTRIC MOTOR

(75) Inventor: Koichi Akita, Yamanashi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 332 days.

(21) Appl. No.: 10/586,441

(22) PCT Filed: Mar. 2, 2005

(86) PCT No.: PCT/JP2005/004023

§ 371 (c)(1),
(2), (4) Date: Jul. 18, 2006

(87) PCT Pub. No.: WO2005/085610

PCT Pub. Date: Sep. 15, 2005

(65) Prior Publication Data

US 2008/0148730 A1    Jun. 26, 2008

(30) Foreign Application Priority Data

Mar. 4, 2004    (JP)    ............................. 2004-061236

(51) Int. Cl.
F02B 33/44    (2006.01)
F02M 25/07    (2006.01)
F02B 37/12    (2006.01)
F02B 37/14    (2006.01)

(52) U.S. Cl. .......................... 60/608; 60/612; 60/605.2; 290/52

(58) Field of Classification Search ............ 60/607–609, 60/612, 605.2; F02B 37/14, 37/12
See application file for complete search history.

(56) References Cited

U.S. PATENT DOCUMENTS

| | | | | |
|---|---|---|---|---|
| 6,029,452 | A | * | 2/2000 | Halimi et al. ................. 60/608 |
| 6,079,211 | A | * | 6/2000 | Woollenweber et al. ....... 60/608 |
| 6,141,965 | A | * | 11/2000 | Woollenweber et al. ....... 60/608 |
| 6,637,204 | B2 | * | 10/2003 | Ellmer et al. ................. 60/608 |
| 6,688,104 | B2 | * | 2/2004 | Baeuerle et al. .............. 60/608 |
| 6,883,324 | B2 | * | 4/2005 | Igarashi et al. ............... 60/608 |
| 6,907,867 | B2 | * | 6/2005 | Igarashi et al. ............... 60/608 |
| 6,938,420 | B2 | * | 9/2005 | Kawamura et al. ............ 60/608 |

(Continued)

FOREIGN PATENT DOCUMENTS

CN    1388856 A    1/2003

(Continued)

Primary Examiner—Thai-Ba Trieu
(74) Attorney, Agent, or Firm—Oliff & Berridge, PLC (57) ABSTRACT

An object of the present invention is to provide a control apparatus for an electrically assisted supercharger capable of effectively compensating for an output drop even with decrease in the atmospheric pressure. A control apparatus for an electrically assisted supercharger according to the present invention has a supercharger 20 disposed on an intake passage 5 of an internal combustion engine 1 mounted on a vehicle, and driven by an electric motor 20a, a controller 16, 21 for controlling the electric motor 20a to control a boost pressure, and a pressure detector 30 for detecting a state of the atmospheric pressure, and is characterized in that when the atmospheric pressure detected by the pressure detector 30 becomes less than a predetermined value, the controller 16, 21 makes a driving force of the electric motor 20a larger than that when the atmospheric pressure is not less than the predetermined value.

12 Claims, 6 Drawing Sheets

U.S. PATENT DOCUMENTS

| | | | |
|---|---|---|---|
| 7,210,296 B2 * | 5/2007 | Bolz et al. .................... 60/608 |
| 2003/0051474 A1 | 3/2003 | Shirakawa | |

FOREIGN PATENT DOCUMENTS

| JP | A 6-288246 | 10/1994 |
| JP | A 11-132049 | 5/1999 |
| JP | A 2001-336433 | 12/2001 |
| JP | A 2002-115553 | 4/2002 |

* cited by examiner

CONTROL DEVICE FOR SUPERCHARGER WITH ELECTRIC MOTOR

TECHNICAL FIELD

The present invention relates to a control apparatus for an electrically assisted supercharger which controls the supercharger with an electric motor disposed on an intake passage of an internal combustion engine mounted on a vehicle.

BACKGROUND ART

There are well-known internal combustion engines provided with a turbocharger on the intake passage of the engine and configured to achieve high power (or low-fuel consumption) through supercharging by the turbocharger. Japanese Patent Application Laid-Open No. 11-132049 also discloses the internal combustion engine with the turbocharger.

DISCLOSURE OF THE INVENTION

An internal combustion engine takes in air from the atmosphere and uses it in combustion. The output reduces with decrease in the intake air mass. For example, a decrease of the atmospheric pressure results in decreasing the air mass per unit volume and thus decreasing the output. It is thus common practice to increase the throttle opening so as to increase the intake air volume to prevent the decrease of the air mass. However, if the turbocharger is provided with some variable control mechanism, this mechanism will be used to increase the boost pressure and thereby compensate for the decrease of the output. An example of this mechanism can be a variable nozzle mechanism which the turbocharger described in the aforementioned Japanese patent application has.

The variable nozzle mechanism is a mechanism in which a plurality of vanes are disposed in an exhaust input part into a turbine wheel and which variably controls the exhaust flow rate by changing the gap between the vanes (variable nozzle opening). The turbine output is optimized by variably controlling the variable nozzle opening. However, the variable nozzle mechanism is already at the minimum opening when the internal combustion engine is in a low load region, and it is almost always the case that there is no space for increase in the boost pressure upon a decrease of the atmospheric pressure. If the nozzle opening is narrowed down too much, it will lead to a decrease of supercharging efficiency (increase of back pressure) as a turbocharger and, in turn, to reduction of fuel consumption. For this reason, there were desires for the output compensation in such cases. Therefore, an object of the present invention is to provide a control apparatus for an electrically assisted supercharger capable of effectively compensating for the decrease of the output even with decrease of the atmospheric pressure.

A control apparatus for an electrically assisted supercharger according to the present invention comprises a supercharger disposed on an intake passage of an internal combustion engine mounted on a vehicle, and driven by an electric motor; controlling means for controlling the electric motor to control a boost pressure; and pressure detecting means for detecting a state of the atmospheric pressure, wherein when the atmospheric pressure detected by the pressure detecting means becomes less than a predetermined value, the controlling means makes a driving force of the electric motor larger than that when the atmospheric pressure is not less than the predetermined value.

Preferably, the control apparatus further comprises intake air mass detecting means for detecting an intake air mass, and the controlling means determines an increase of the driving force of the electric motor, based on a deviation between the intake air mass detected by the intake air mass detecting means and a target intake air mass determined based on an operating state of the internal combustion engine.

In another aspect, preferably, the control apparatus further comprises a turbocharger for implementing supercharging by making use of an exhaust flow of the internal combustion engine, and a variable nozzle mechanism for variably controlling a supercharging state by the turbocharger, and when the atmospheric pressure detected by the pressure detecting means becomes less than the predetermined value, consideration to the intake air mass is prohibited on the occasion of determining a control quantity of the variable nozzle mechanism.

Furthermore, preferably, the electric motor is built in the turbocharger, and the supercharger and the turbocharger are integrated with each other.

BEST MODE FOR CARRYING OUT THE INVENTION

Figure 1:
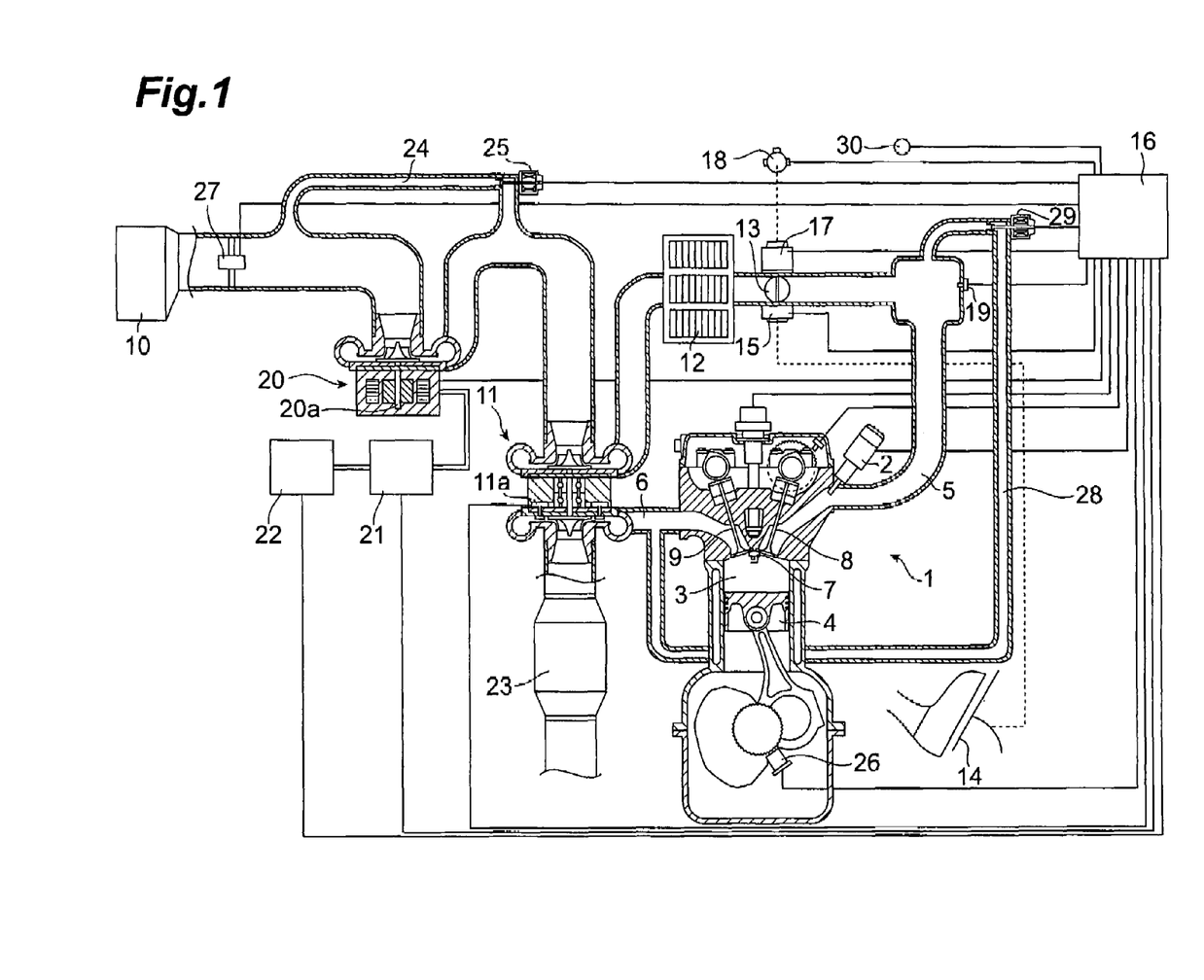
FIG. 1 is a configuration diagram showing a configuration of an internal combustion engine (engine) having an embodiment of the control apparatus of the present invention.

An embodiment of the control apparatus of the present invention will be described below. FIG. 1 shows engine 1 having the control apparatus of the present embodiment.

The term "boost pressure" is sometimes used as a term indicating a pressure difference from the atmospheric pressure. On the other hand, the term "boost pressure" is also sometimes used as a term indicating an absolute pressure in the intake pipe. If it is necessary to describe the boost pressure by definitely discriminating them, the description will be given so as to definitely indicate the meanings thereof. For example, when the boost pressure control is carried out based on an output of a pressure sensor for detecting the pressure in the intake pipe, it is easy to control the boost pressure, based on the "boost pressure as a difference from the atmospheric pressure," if the pressure sensor is a sensor for detecting the differential pressure from the atmospheric pressure; it is easy to control the boost pressure, based on the "intake air pressure as an absolute pressure," if the pressure sensor is a sensor for detecting the absolute pressure.

The engine 1 described in the present embodiment is a multicylindered engine, but only one cylinder thereof is illustrated as a sectional view in FIG. 1. The engine 1 is arranged to inject fuel into an intake port by injector 2 and to mix the fuel with intake air taken in through intake passage 5, to generate an air-fuel mixture. The air-fuel mixture thus generated is guided into cylinder 3 to be fired and burned by spark plug 7. A supercharger 20 with an electric motor 20a, and a turbocharger 11, which will be described later, are used to charge more intake air, thereby achieving not only higher power but also lower fuel consumption. An intake valve 8 is arranged to open and close between the interior of each cylinder 3 and the intake passage 5. Exhaust gas after combustion is discharged into an exhaust passage 6. An exhaust valve 9 is arranged to open and close between the interior of each cylinder 3 and the exhaust passage 6. There are the following components arranged in order from upstream on the intake passage 5: air cleaner 10, air flow meter 27, supercharger 20, turbocharger 11, intercooler 12, throttle valve 13, and so on.

The air cleaner 10 is a filter for removing foreign particles, dust, etc. from the intake air. The air flow meter (intake air mass detecting means) 27 of the present embodiment is of a hot wire type, and detects the intake air mass as a mass flow rate. The supercharger 20 is one electrically driven by a built-in motor (electric motor) 20a. A compressor wheel is directly coupled to an output shaft of the motor 20a. The motor 20a of the supercharger 20 is connected through a controller (controlling means) 21 to a battery 22. The controller 21 controls a supplied power to the motor 20a to control driving of the motor 20a. The controller 21 can detect a number of rotations of the motor 20a (i.e., rpm of the compressor wheel).

A bypass line 24 is provided so as to bypass the supercharger 20 while passing between upstream and downstream locations thereof. A valve 25 for regulating an intake air mass fed through the bypass line 24 is disposed on the bypass line 24. The valve 25 is electrically driven to optionally regulate the air flow rate through the bypass line 24. While the supercharger 20 is not in action, the supercharger 20 acts as an inhalation resistance, and thus the valve 25 opens the bypass line 24 to prevent the supercharger 20 from acting as an inhalation resistance. Conversely, during action of the supercharger 20, the valve 25 closes the bypass line 24, in order to prevent the intake air supercharged by the supercharger 20 from flowing backward through the bypass line 24.

The turbocharger 11 is disposed between the intake passage 5 and the exhaust passage 6 to effect supercharging. The turbocharger 11 is a well-known one, and has a variable nozzle mechanism 11a as a variable-geometry mechanism. The variable nozzle mechanism 11a is controlled by ECU (controlling means) 16 which will be described later. In the engine 1 of the present embodiment, the supercharger 20 and turbocharger 11 disposed in series can implement supercharging. The air-cooling type intercooler 12 for decreasing the temperature of the intake air raised in temperature with increase of pressure due to supercharging by the supercharger 20 and/or turbocharger 11 is disposed downstream the turbocharger 11. The intercooler 12 decreases the temperature of the intake air, so as to raise the charging efficiency.

The throttle valve 13 for controlling the intake air mass is disposed downstream the intercooler 12. The throttle valve 13 of the present embodiment is a so-called electronically controlled induction throttling mechanism, and is arranged as follows: an accelerator positioning sensor 15 detects a manipulated amount of accelerator pedal 14, and the ECU 16 determines an opening level of the throttle valve 13 on the basis of the detection result of the sensor 15 and other information quantity. The throttle valve 13 is opened and closed by throttle motor 17 provided in association therewith. A throttle positioning sensor 18 for detecting the opening level of throttle valve 13 is also provided in association with the throttle valve 13.

A pressure sensor 19 for detecting the pressure (boost pressure and intake pressure) in the intake passage 5 is also disposed downstream the throttle valve 13. A sensor for detecting the boost pressure may be attached to the intake manifold part. These sensors 15, 18, 19, and 27 are connected to the ECU 16 and feed their detection results to the ECU 16. An atmospheric pressure sensor (pressure detecting means) 30 for detecting the atmospheric pressure is also connected to the ECU 16. The ECU 16 is an electronic control unit composed of a CPU, a ROM, a RAM, and so on. The aforementioned injector 2, spark plug 7, valve 25, air flow meter 27, controller 21, battery 22, etc. are connected to the ECU 16, and these components are controlled by a signal from the ECU 16, or a state of each component (a charge state if it is battery 22) is monitored thereby.

On the other hand, an exhaust cleaning catalyst 23 for cleaning the exhaust gas is located downstream the turbocharger 11 on the exhaust passage 6. A crank positioning sensor 26 for detecting a rotational position of the crank shaft is attached to near the crank shaft of the engine 1. The crank positioning sensor 26 can also detect the engine speed from the position of the crank shaft.

There is provided an EGR (Exhaust Gas Recirculation) passage 28 for recirculating the exhaust gas from the exhaust passage 6 (upstream part of the turbocharger 11) to the intake passage 5 (surge tank part). An EGR valve 29 for regulating the rate of exhaust gas recirculation (EGR amount) is mounted on the EGR passage 28. An opening level (DUTY ratio) of the EGR valve 29 is also controlled by the aforementioned ECU 16. Although not shown, an EGR cooler for cooling the EGR gas by use of cooling water of engine 1 is disposed between the EGR valve 29 and the surge tank of the intake passage 5.

Next, the supercharging control in the engine 1 of the present embodiment will be described. The present embodiment is arranged to enhance the supercharging effect by the supercharger 20 so that a driving force of the motor 20a is increased more with decrease in the atmospheric pressure (when the atmospheric pressure becomes less than a predetermined value) than without decrease in the atmospheric pressure, in order to prevent a drop of output. Since the turbocharger 11 is provided with the variable nozzle mechanism 11a, the control is carried out in collaboration therewith. Furthermore, since the engine 1 is provided with the EGR mechanism, the control is also carried out in collaboration with the EGR system.

FIG. 1 shows the flowchart of the supercharging control. The first step is to read the engine speed Ne and the engine load (step 200). The engine speed is detected by the crank positioning sensor 26. The engine load is calculated based on the intake air mass detected by the air flow meter 27 and the throttle stroke detected by the throttle positioning sensor 18. The next step is to determine whether the engine is in a region to perform the EGR control, based on the detected engine speed Ne and engine load (step 205).

Figure 3:
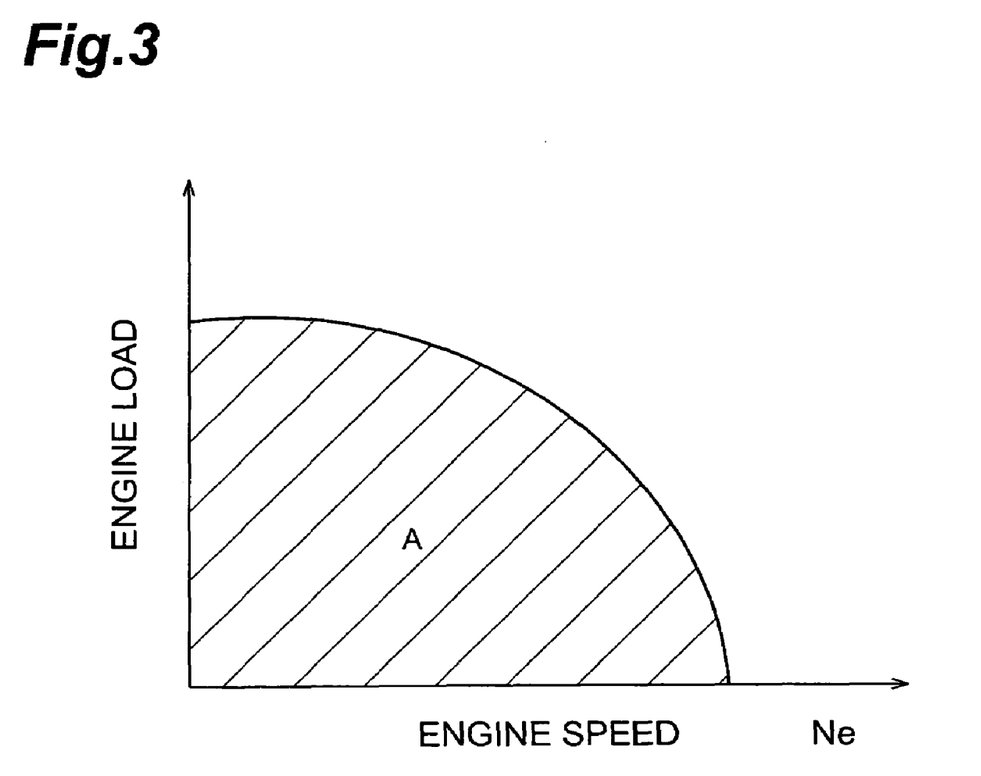
FIG. 3 is a map used in determining whether the engine is in an EGR execution region.

FIG. 3 shows an example of a map used in this step. In the map of FIG. 3, the horizontal axis represents the engine speed Ne and the vertical axis the engine load. The EGR control is executed in a region A indicated by hatching in the map, to recirculate the exhaust gas to the intake side. As apparent from the map of FIG. 3, no recirculation of exhaust gas is carried out in a high rotation region or in a high load region. When the step 205 ends up with no, normal control is carried out by feedback control based on the intake pressure detected by the pressure sensor 19 (step 210).

Figure 4:
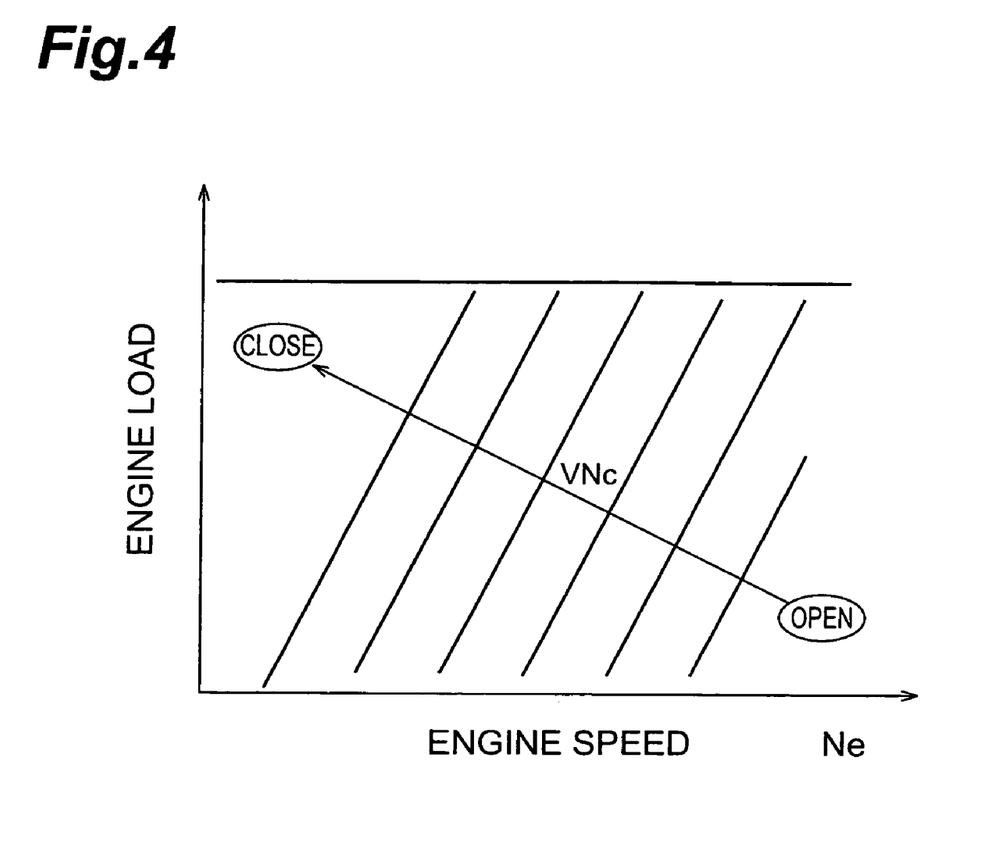
FIG. 4 is a map used in determining a target value VN0 for variable nozzle opening.

On the other hand, when the step 205 ends up with yes so as to carry out the EGR control, a target variable nozzle opening VN0 is calculated and the calculated target variable nozzle opening VN0 is outputted to the variable nozzle mechanism 11a (step 215). The opening of the variable nozzle mechanism 11a is changed based on this signal. At this time, a map as shown in FIG. 4 is used in the calculation of the target variable nozzle opening VN0. The map of FIG. 4 has the horizontal axis representing the engine speed Ne and the vertical axis representing the engine load, and numerical values of target variable nozzle opening VN0 are allocated to respective regions in the map. The target variable nozzle opening VN0 becomes smaller with lower rotation and higher load, and the target variable nozzle opening VN0 becomes larger with higher rotation and lower load.

Figure 5:
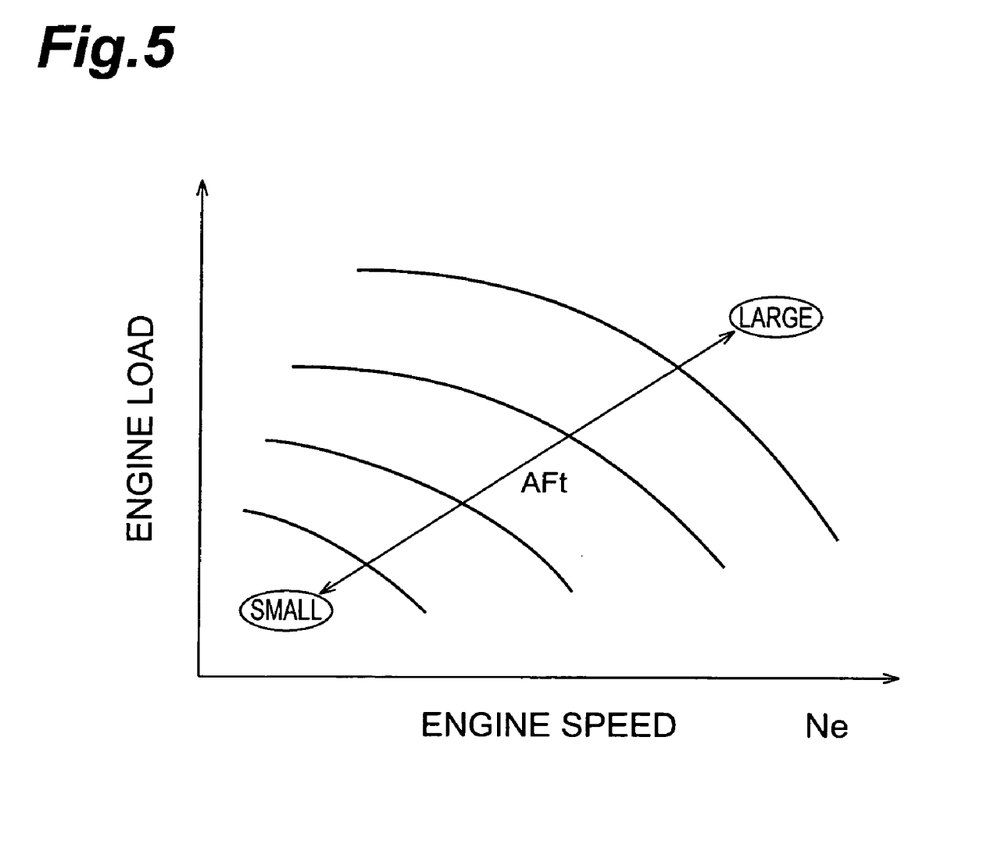
FIG. 5 is a map used in determining a target value AFt for new air mass.

The step subsequent to the step 215 is to read a new air mass AF which is an intake air mass newly taken in after the start of the control of the variable nozzle mechanism 11a toward the target variable nozzle opening VN0 (step 220). The new air mass AF is detected by the air flow meter 27. In this stage, the new air taken in from the atmosphere is mixed with the recirculated exhaust gas and thereafter fuel is injected to generate the air-fuel mixture to be introduced into the cylinder 3. The next step is to calculate a target value AFt for the new air mass (step 225). At this time, a map as shown in FIG. 5 is used in the calculation of the new air mass target AFt. The map of FIG. 5 has the horizontal axis representing the engine speed Ne and the vertical axis representing the engine load, and numerical values of new air mass target AFt are allocated to respective regions in the map. The new air mass target AFt becomes smaller with lower rotation and lower load and the new air mass target AFt becomes larger with higher rotation and higher load.

Figure 2:
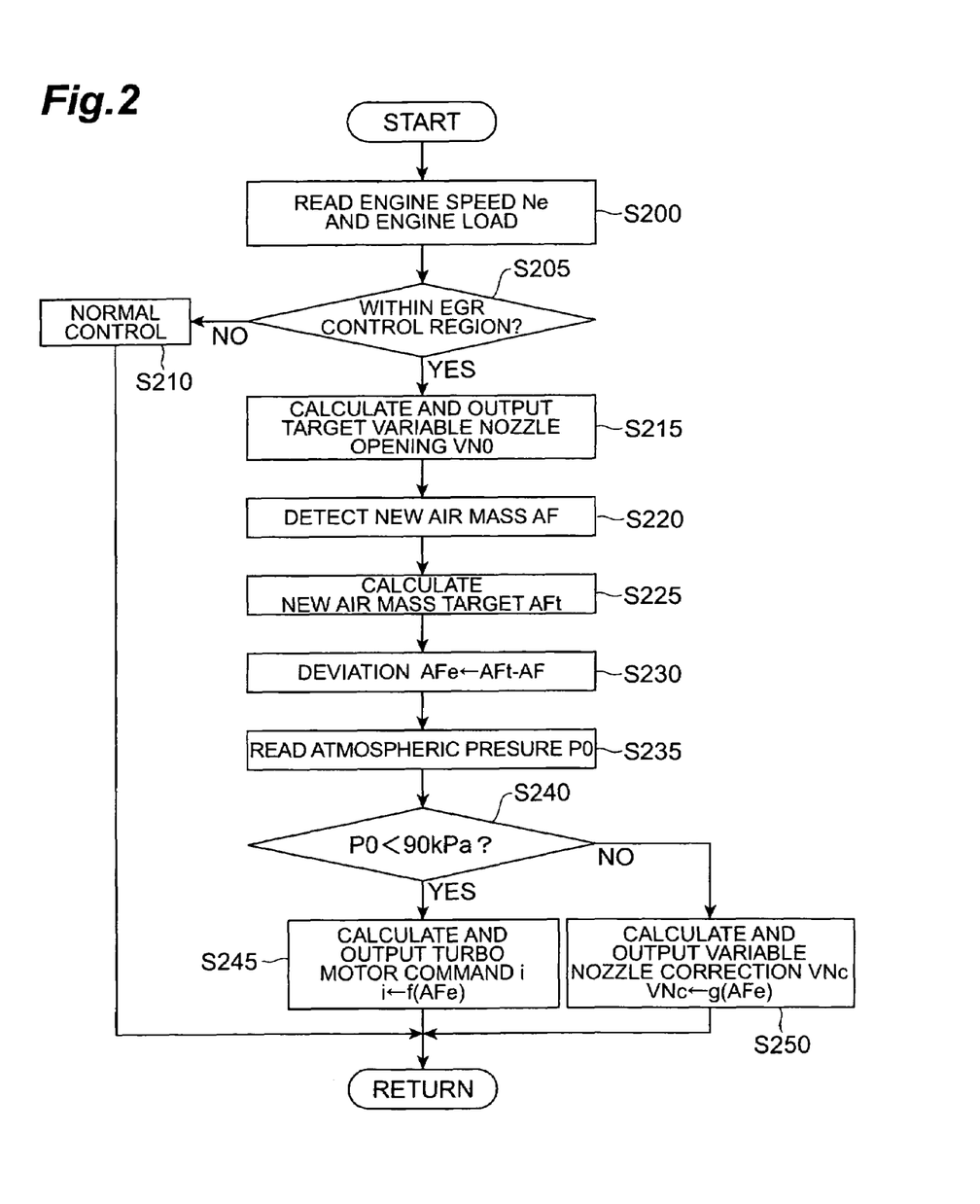
FIG. 2 is a flowchart of supercharging control according to an embodiment of the control apparatus of the present invention.

The step subsequent to step 225 is to calculate a deviation between the target and actual value, AFe=AFt−AF (step 230). Furthermore, the subsequent step is to detect the atmospheric pressure P0 by the pressure sensor 19 (step 235). The next step is to determine whether the detected atmospheric pressure P0 is less than a predetermined pressure (90 kPa herein) (step 240). When the atmospheric pressure P0 is less than the predetermined pressure, it can be determined that the intake air density is lowered, and in this case a command value (drive current value or the like) i to the motor 20a is calculated based on a function f(AFe) of the aforementioned deviation AFe, in order to increase the driving force of the motor 20a to increase the intake air volume to secure the intake air mass. The calculated command value i is outputted to the motor 20a (step 245). The motor 20a is driven based on this command value i. This command value i is so set that the driving force becomes larger than that when the atmospheric pressure is not less than the predetermined pressure. In other words, the aforementioned function f(AFe) is so defined. The control of the motor 20a is a combination of the intake pressure feedback control by the pressure sensor 19 with the intake air mass feedback control by the air flow meter 27.

When the step 240 ends up with yes, i.e., when the atmospheric pressure P0 is less than the predetermined pressure, the control of the variable nozzle mechanism 11a is a combination of the map control by the aforementioned target variable nozzle opening VN0 with the intake pressure feedback control by the pressure sensor 19. Namely, at this time, consideration to the intake air mass is prohibited on the occasion of determining the variable nozzle opening. This is for the purpose of preventing degradation of fuel consumption due to decrease of efficiency of the turbocharger 11 with increase of back pressure caused by narrowing of the variable nozzle opening for the output compensation if the atmospheric pressure P0 is less than the predetermined pressure.

In this step, the command value i to the motor 20a, i.e., an increase of driving force of the motor 20a is determined based on the aforementioned deviation AFe. This makes it feasible to certainly secure the new air mass enough to prevent occurrence of smoke without need for decrease in the EGR amount.

Although not described in detail herein, the feedback control for EGR rate toward a target is carried out in the EGR region, thereby achieving reduction in amount of NOx discharge due to decrease in combustion temperature. As the new air mass is secured in this manner, the EGR rate can be maintained and cleaning of exhaust gas can also be securely carried out.

If it is impossible to secure the new air mass by the motor 20a with decrease in the atmospheric pressure and if a decrease in the intake air mass occurs with decrease in the atmospheric pressure, for example, at highlands, there would be no means except for decreasing the EGR amount according to the decrease in the atmospheric pressure so as to prevent discharge of smoke. However, the present embodiment is able to secure the new air mass and also secure the EGR amount, and thereby to maintain the driving performance and exhaust gas cleaning performance at levels equivalent to those without decrease in the atmospheric pressure.

On the other hand, when the step 240 ends up with no, a correction amount VNc of the variable nozzle mechanism 11a is calculated based on a function g(AFe) of the aforementioned deviation AFe (step 250). A command value to be outputted to the variable nozzle mechanism 11a is an opening level calculated according to the aforementioned target opening VN0+correction amount VNc. The function g is one for determining the correction amount VNc to open or narrow the variable nozzle opening so as to decrease the deviation, with increase in the aforementioned deviation AFe. When the step 240 ends up with no, the control of the motor 20a is only the intake pressure feedback control by the pressure sensor 19, without the intake air mass feedback control by the air flow meter 27.

The present invention does not have to be limited to the above-described embodiment. For example, the above-described embodiment used the atmospheric pressure (pressure sensor) 30 as the pressure detecting means. However, the pressure detecting means may be a car navigation system or the like. While an altitude difference is acquired from the navigation system, the atmospheric pressure may be detected (or estimated) based on the altitude difference. The navigation system may be one with a communication function, and the atmospheric pressure may be detected based on weather information (including the atmospheric pressure) and location information acquired through the communication function.

Figure 6:
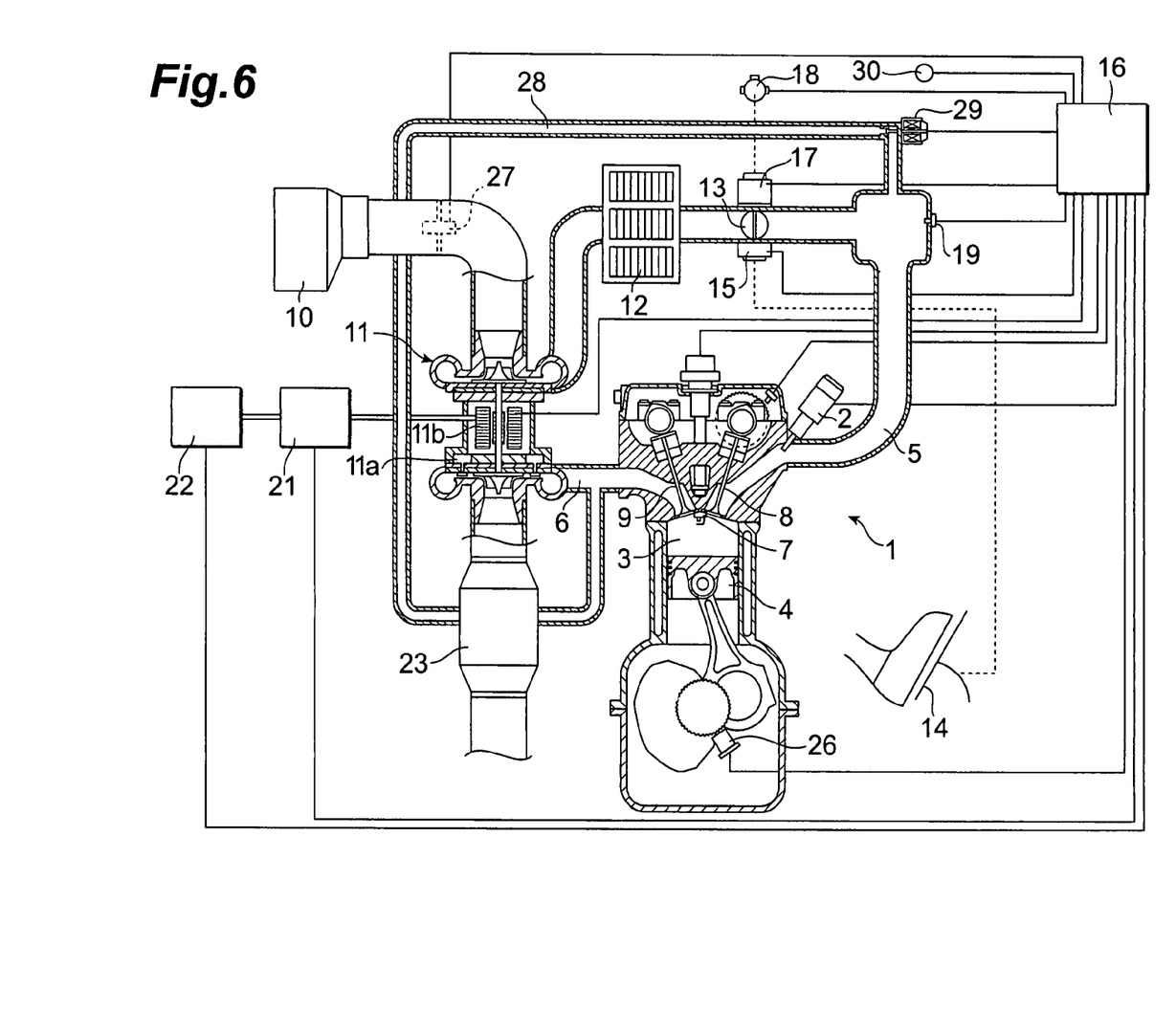
FIG. 6 is a configuration diagram showing a configuration of an internal combustion engine (engine) having another embodiment of the control apparatus of the present invention.

The embodiment shown in FIG. 1 is provided with the supercharger 20 equipped with the motor 20a upstream the turbocharger 11, separately from the turbocharger 11. However, the present invention is applicable to superchargers with an electric motor (motor), and is also applicable to a structure in which an electric motor (motor) 11b is built in a turbocharger 11, as shown in FIG. 6. The embodiment shown in FIG. 6 has much the same configuration as that shown in FIG. 1, except that the motor 11b is provided (and except that the supercharger 20 is not provided), and thus the same components are denoted by the same reference symbols, without detailed description thereof. In the embodiment shown in FIG. 6, the motor 11b is incorporated so that an output axis thereof is a rotational shaft of a turbine/compressor wheel of the turbocharger 11.

This configuration can decrease the number of units, and can increase space efficiency in the engine compartment. It also facilitates the assembly of the engine 1. The various control maps are different from those for the structure shown in FIG. 1, because of change in the relationship between power applied to the motor 20a and supercharging effect or the like, but the control shown in the flowchart of FIG. 2 can be basically executed in the same manner, with similar effect.

INDUSTRIAL APPLICABILITY

The control apparatus for the electrically assisted supercharger according to the present invention is able to variably control the boost pressure by the electrically assisted supercharger and to achieve the optimal supercharging effect. The state of the atmospheric pressure is detected by the pressure detecting means and the driving force of the electric motor is made larger when the atmospheric pressure becomes less than the predetermined value than that when the atmospheric pressure is not less than the predetermined value; this can effectively prevent the output drop due to decrease in the atmospheric pressure.

The invention claimed is:

1. A control apparatus for an electrically assisted supercharger, comprising:
    a supercharger disposed on an intake passage of an internal combustion engine mounted on a vehicle, driven by an electric motor;
    controlling means for controlling the electric motor to control a boost pressure;
    pressure detecting means for detecting a state of the atmospheric pressure,
    an intake air mass detecting means for detecting the intake air mass;
    a turbocharger for performing supercharging by making use of an exhaust flow of the internal combustion engine; and
    a variable nozzle mechanism for variably controlling a supercharging state by the turbocharger;
    wherein:
        when the atmospheric pressure detected by the pressure detecting means becomes less than a predetermined value, the controlling means makes a driving force of the electric motor larger than that when the atmospheric pressure is not less than the predetermined value,
        when the atmospheric pressure detected by the pressure detecting means becomes more than the predetermined value, the variable nozzle mechanism controls the variable nozzle opening with a feedback control based on a deviation in an intake air mass detected by the intake air mass detecting means and a target intake air mass determined based on an operating state of the internal combustion engine, and
        when the atmospheric pressure detected by the pressure detecting means becomes less than the predetermined value, the variable nozzle mechanism prohibits the variable nozzle opening with the feedback control, based on the deviation between the intake air mass and the targeted intake air mass, and controls the variable nozzle opening with the targeted variable nozzle opening calculated based on the rotation number and load of the internal combustion engine.

2. The control apparatus for the electrically assisted supercharger according to claim 1, wherein when the atmospheric pressure detected by the pressure detecting means becomes less than the predetermined value, the variable nozzle mechanism controls the variable nozzle opening by modification of the target variable opening with an intake pressure feedback.

3. The control apparatus for the electrically assisted supercharger according to claim 2, wherein when the atmospheric pressure detected by the pressure detecting means becomes less than the predetermined value, the control means determines an increase of the driving force of the electric motor, based on the deviation between the intake air mass detected by the intake air mass detecting means and the target intake air mass determined based on an operating state of the internal combustion engine.

4. The control apparatus for the electrically assisted supercharger according to claim 3, wherein the electric motor is built in the turbocharger and wherein the supercharger and the turbocharger are integrated with each other.

5. The control apparatus for the electrically assisted supercharger according to claim 3, wherein the controlling means controls the electric motor so as to secure the target intake air mass, with further consideration to an output of the internal combustion engine to be compensated for because of the prohibition of consideration to the intake air mass on the occasion of determining the control quantity of the variable nozzle mechanism.

6. The control apparatus for the electrically assisted supercharger according to claim 3, wherein the controlling means prohibits consideration to the intake air mass on the occasion of determining the control quantity of the variable nozzle mechanism and controls the electric motor so that the intake air mass becomes coincident with the target intake air mass.

7. The control apparatus for the electrically assisted supercharger according to claim 2, comprising an exhaust gas recirculation system for recirculating exhaust gas discharged from the internal combustion engine, to the intake passage,
    wherein the controlling means controls the exhaust gas recirculation system so that an amount of the exhaust gas recirculated to the intake passage becomes coincident with a target exhaust gas recirculation amount determined based on the operating state of the internal combustion engine.

8. The control apparatus for the electrically assisted supercharger according to claim 2, wherein the controlling means controls the electric motor so that the intake air mass becomes coincident with the target intake air mass.

9. The control apparatus for the electrically assisted supercharger according to claim 1, wherein when the atmospheric pressure detected by the pressure detecting means becomes less than the predetermined value, the control means determines an increase of the driving force of the electric motor, based on the deviation between the intake air mass detected by the intake air mass detecting means and the target intake air mass determined based on an operating state of the internal combustion engine.

10. The control apparatus for the electrically assisted supercharger according to claim 9, wherein the electric motor is built in the turbocharger and wherein the supercharger and the turbocharger are integrated with each other.

11. The control apparatus for the electrically assisted supercharger according to claim 9, wherein the controlling means controls the electric motor so as to secure the target intake air mass, with further consideration to an output of the internal combustion engine to be compensated for because of the prohibition of consideration to the intake air mass on the occasion of determining the control quantity of the variable nozzle mechanism.

12. The control apparatus for the electrically assisted supercharger according to claim 9, wherein the controlling means prohibits consideration to the intake air mass on the occasion of determining the control quantity of the variable nozzle mechanism and controls the electric motor so that the intake air mass becomes coincident with the target intake air mass.

* * * * *